(12) United States Patent
Loen

(10) Patent No.: US 6,434,625 B1
(45) Date of Patent: Aug. 13, 2002

(54) GENERALIZING DATA STREAMS TO OVERCOME DIFFERENCES IN WORD LENGTH AND BYTE ORDER

(75) Inventor: Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/351,663

(22) Filed: Jul. 13, 1999

(51) Int. Cl.[7] .............................................. G06F 15/16

(52) U.S. Cl. ...................................... 709/236; 712/300

(58) Field of Search ................................ 709/231, 236; 712/300

(56) References Cited

U.S. PATENT DOCUMENTS

| | | | | |
|---|---|---|---|---|
| 4,949,373 A | * | 8/1990 | Baker, Jr. et al. .............. | 379/96 |
| 5,524,250 A | | 6/1996 | Chesson et al. ............. | 395/775 |
| 5,687,337 A | | 11/1997 | Carnevale et al. .......... | 395/380 |
| 5,781,763 A | | 7/1998 | Beukema et al. ........... | 395/500 |
| 5,819,283 A | * | 10/1998 | Turkowski .................. | 707/103 |
| 5,961,640 A | * | 10/1999 | Chambers et al. .......... | 712/300 |
| 6,298,391 B1 | * | 10/2001 | Kennedy et al. ............ | 709/328 |

OTHER PUBLICATIONS

The Unicode Standard, A Technical Introduction. (1999) at http://www.unicode.org/standard/principles.htm.

Cohen, Danny, "On Holy Wars and a Plea for Peace" USC/ISI (Apr. 1, 1980) at http://www.op.net/docs/RFCs/ien—137, pp. 1–13.

* cited by examiner

Primary Examiner—John A. Follansbee
(74) Attorney, Agent, or Firm—Karuna Ojanen; James R. Nock

(57) ABSTRACT

A computer system and method for use with the computer system to dynamically adapt to a data structure layout other than its own. The data may be an incoming data stream from outside or may be stored within its main memory. Between the transmitting and the receiving CPU there must be an understanding of the conceptual level and format of the data which is transferred. A prefix word in which details of the data structure layout is encoded is generated. The prefix word is appended to the data and transmitted to another CPU or used by the same CPU. Upon receipt of the data, the prefix word is read and decoded and the receiving CPU can dynamically adapt to details of the data structure layout in order to use the data which was generated and transmitted in a heretofore unknown data structure layout. The prefix word may be a Unicode reserved character of the form FExxyyFF or FFyyxxFE wherein FExxyyFF represents the same endianness, preferably big endian, and FFyyxxFE represents the other endianness, preferably little endian. Once endianness is resolved, then the position of xxyy is unambiguously known and specific features of the data structure layout, such as integer and pointer sizes, rounding/padding rules, byte alignment, bit alignment, etc. are encoded in an agreed-upon bit sequence. Thus, a method and a computer which can dynamically adapt to an unknown data structure is presented.

9 Claims, 6 Drawing Sheets

|  | Decimal | Hexadecimal (Little Endian) | Hexadecimal (Big Endian) |
|---|---|---|---|
| byte | 124 | 7C | 7C |
| half-word | 50,000 | 50 C3 | C3 50 |
| word | 1,000,000,000 | 00 CA 9A 3B | 3B 9A CA 00 |

FIG. 1 (PRIOR ART)

GLOBAL OBJECTS
DERIVED FROM xxyy

- endianness

- integer size

- long integer size

- pointer size

- unicode endian

- pad array

FIG. 3

GENERALIZING DATA STREAMS TO OVERCOME DIFFERENCES IN WORD LENGTH AND BYTE ORDER

TECHNICAL FIELD

The present invention relates generally to the field of data processing and more particularly to a receiver of data from a sender being able to interpret the sender's native data structure layout.

BACKGROUND OF THE INVENTION

Since their inception, the basic components of computers are still the same: a computer processor and a memory. A computer processor is the active component of the computer system and manipulates data retrieved from the computer's memory to process tasks, programs, or processes assigned to the computer system. Computer memory stores information used by the computer and works in much the same way as the memory of a person. For example, just as people memorize lists, poetry and events, a computer system stores words, numbers, pictures, etc. in its several memories. Similarly, specialized hardware within a computer processor reads and interprets information from computer memory analogous to a human reading and interpreting printed words. Moreover, just as the arrangement of words on a page is important to human readers, the arrangement of information in the computer's memory is important to the computer system. For example, words in English are written from left to right, words in Hebrew are written from right to left, and words in Japanese are written top to bottom and right to left. One arrangement is not better than the other, it is only different. Similarly, bits are arranged in different formats in a computer system and, for the most part, one arrangement is not better than another which permits many approaches to organizing information in computer systems. Computer system designers have thus developed different schemes for organizing computer data.

The basic building block of all computer data is the bit, any number of which, usually a multiple of two, may comprise a byte and any number of bytes, again usually a multiple of two, may comprise a word. In the examples provided herein, a byte of data is eight bits. Four bytes or thirty-two bits of data is a word; a half-word is two bytes or sixteen bits; and a double word is eight bytes or sixty-four bits. One such difference of data representation exists for two particular forms of computer data called floating point information and binary integer information: big endian and little endian. If a binary number is implemented using. four eight bit bytes, little endian presents the low order eight bits first whereas big endian has the high order eight bits first. Illustrated in FIG. 1 are examples of the big and little endian formats of a byte, a half-word, and a word. The decimal integer one hundred twenty four (124) can be represented in hexadecimal notation as 7C and is one byte of computer data. As shown in FIG. 1, there is no difference in the byte order between little endian and big endian formats for the integer 124. The next integer, fifty thousand (50,000), however, comprises two bytes or is a half word. In hexadecimal notation, the little endian format of the integer is 50 C3, whereas in the big endian format, the integer is represented as C3 50. The differences in endian format is illustrated even more vibrantly for larger integers, e.g., one billion, which is a word of data. In little endian format, one billion is represented as hexadecimal 00 CA 9A 3B and in big endian, it is represented as 3B 9A CA 00. The little endian arrangement is used in computer processors by INTEL Corporation were incorporated into IBM PC and compatible personal computers. The big endian arrangement was adopted by other computer systems such as those manufactured by APPLE Corporation having processors designed by MOTOROLA and IBM Corporations.

In the past, the choice of endian format was not a significant problem because computers seldom interchanged data or did so in ways that were not dependent upon binary data formats. As the networking of computers increased, however, the endian problem became more severe because operating systems, programming languages, and computer architectures maintain a preference for a particular endian format. For example, and as is known all too well, persons who used IBM PC or compatible computers with the Intel processors could not generally share computer programs and information with persons who had APPLE Macintosh computers, and vice versa. Large corporations which used both types of computers found it difficult to distribute information among employees. Some businesses, moreover, found that they could not easily share information with suppliers or buyers whose computers did not have the same data format. Consequently, computer software developers devoted additional time and resources to develop multiple versions of the same software to support different types of computer data formats and different computer systems.

The explosive growth of stand-alone computers used in businesses and homes in conjunction with the world wide web now demands that there be compatibility between the different types of operating and computer systems. In today's computing environment, a program on one machine or in one language may analyze data from another machine or in another language on the same machine. Each machine and/or application program may have not only have a different endian format but also its own peculiar data dependencies. Thus, it is not uncommon for two different computers to want to exchange data over a network wherein the computers have different processors, different data representations and different operating systems.

Today data is transferred through computer networks using formal and rigidly defined protocols. Protocol information is often defined by international standards such as the ISO/OSI protocol stack, CCITT recommendations for data communications and telephony, IEEE 802 standards for local area networking and ANSI standards. Other examples include the TCP/IP protocol stack, defined by the U.S. Department of Defense, plus other military and commercial data processing standards such as the U.S. Navy SAFENET standard, the Xerox Corporation XNS protocol suite, the Sun Microsystems NFS protocol, and compression standards for HDTV and other video formats. In these formats byte order and other features of the data structure layout are fixed. But the problem of data transfer between or among different systems is only exacerbated by these rigid protocols because now data transfer is not only constrained by computer processor formats, operating systems, and programming languages but also data transfer protocols. For many environments, this is not a satisfactory solution.

Endianness, which is just byte order, has already been discussed but actually is only one aspect of data structure layout or data dependency. Some computer languages have abstractions called integers which represent a multi-byte binary number, and pointers which contain a memory address, both of which may vary in size. For example, in C standard, the relational sizes of integers and pointer addresses are presented below:

size of (short)≦size of (int)≦size of (long)≦size of (longlong)

size of (void*)–undefined

In several defacto standards, the sizes of integer types and pointers differ according to the table below:

| word (bits) | short (bytes) | int (bytes) | long (bytes) | longlong (bytes) | pointer (bytes) |
|---|---|---|---|---|---|
| 16 bits | 2 | 2 | 4 | 8 | 2 or 4 |
| 32 bits | 2 | 4 | 4 | 8 | 4 |
| 64 bits(a) | 2 | 4 | 4 | 8 | 8 |
| 64 bits(b) | 2 | 4 | 8 | 8 | 8 |
| Java | 2 | 4 | 8 | not applicable | not applicable |
| AS/400 | 2 | 4 | 4 | 8 | 16 |

"Rounding" rules comprise yet another local data dependency or feature of data structure layouts. Many languages have data "records" or "structures" to indicate a logical, and sometimes physical, aggregation of related data. Some data records have a more favorable bit alignment in a given machine for better performance. Many languages allow the declared aggregation of data items to have extra storage inserted between them to achieve favorable alignment. In C/C++, for example, whether and when to do round up/down is determined by each compiler. Such aggregations are typically called by the C keyword "struct."

It is possible, especially in a language like C or C++, to have source code that adapts to each of these independent data structure layouts through standard recompilation. For many programs, that is the end of the story. As long as the data stays on the same kind of machine and the programs use the same compiler, differences in byte order, rounding, and the like cause no problem. If, however, the purpose of an application program is to analyze data from a variety of sources, the program must now cope with the wide variety of byte orders, rounding, and integer sizes of various incoming data streams. That is, the size and byte order of integers and pointers will vary depending on the particular machine and compiler chosen. Yet, at the source code level, the data is identical.

JAVA™ is a programming language that blossomed in the mid to late 1990s. The concept of Java was to remove software dependence on individual processors and move into the realm of consumer electronics, that is, despite the fanaticism towards certain computer processors and operating systems exhibited by some in the computer industry, most consumers of electronic devices are indifferent when it comes to which particular processor or operating system is used to operate or function on their consumer electronic device so long as it works reliably and seamlessly. Java has also flourished with burgeoning expansion of network computer technology and the rise of the world wide web browser technology on the Internet. Java applications can be written on one computer and transferred over a network, such as the Internet, to any device containing a computer with a Java interpreter regardless of the operating system or the processor in that machine.

Because of Java's independence from a particular processor or operating system, it straddles the endian problem. C/C++ sets endianness at compile time and the endian of the underlying computer is visible to the programmer. A Java interpreter can run in whatever endian format the processor supplies, however, the Java virtual machine presents the illusion of a big endian machine. In a Java virtual machine, the processor's endian ordering doesn't matter so long as it presents the data in proper format for arithmetic operations. Another reason Java is endian independent is that in order to freely but securely exchange code and information among the electronic devices in the network, pointers in memory are excluded to eliminate the possibility of malicious programs accessing arbitrary addresses in memory. Java doesn't allow certain casts, i.e., it doesn't allow storage to be reinterpreted. Yet another reason that Java provides a big endian format is that in key interfaces relating to data input stream and data output stream the data is always presented an element at a time in big endian order on external media.

Many programs, nevertheless, follow the C/C++ policies and so data in either endian format and with varying rules for integers and structure padding may appear on external media or be transmitted "as is" over a network. Thus, there exists a need in the computer industry for a computer tool which enables correct interpretation of data structure layouts, such as byte ordering, integer/pointer sizes, and padding rules, of incoming data which may be different than the computer to which the data is input and which adapts to processor formats, operating system preferences, and programming language idiosyncracies.

SUMMARY OF THE INVENTION

Thus, an embodiment of the invention may be described as a method of computing which comprises the steps of receiving a first data stream in a sender's native data structure layout from a sender, reading a prefix word of the first data stream, and from that prefix word, deriving the sender's native data structure layout. The method may further comprise the step of dynamically reconstructing data of the data stream based on the prefix word in a receiver. The step of deriving the native data structure layout from the prefix word may further comprise determining the endianness of the data stream based on the prefix word and/or determining the existence and size of at least one integer type in the data stream and/or determining the existence and size of pointers and/or determining padding rules/byte alignment of the data stream and/or determining bit alignment. When determining the existence and size of at least one integer type, the method further comprises determining the existence and size of short integers, integers, and long integers. The prefix word interpreted as a byte array may be of the format FFyyxxFE or FExxyyFF in which FFyyxxFE indicates that the sender's native data structure layout is of one endianness, preferably little endian, and FExxyyFF indicates that the sender's native data structure layout is of the other endianness, preferably big endian.

Another embodiment of the invention contemplates a method of computing, comprising the steps of receiving a first data stream in a sender's native data structure layout from a sender, reading a prefix word of the first data stream wherein the prefix word has a format FFyyxxFE or FExxyyFF in which FFyyxxFE indicates that the sender's native data structure layout is of one endianness and FExxyyFF indicates that the sender's native data structure layout is of the other endianness, deriving the sender's native data structure layout from the prefix word, the sender's native data structure layout further comprising the existence and size of short integers, integers, and long integers, the existence and size of pointers, padding rules/byte alignment of the data stream, bit alignment, and dynamically reconstructing data of said data stream based on said prefix word.

Another embodiment of the invention contemplates a computer system, comprising a sender central processing unit (CPU) processing a data stream in a native data structure layout, a prefix word generator to encode the native data structure layout in a prefix word and attach the prefix word to the data stream. The computer system further comprises a receiver CPU to receive the data stream with the attached prefix word and a communication system connecting the sender CPU and the receiver CPU over which the data stream is transmitted, a prefix word decoder to decode the prefix word and dynamically adapt the data so the receiver can use the data in the data stream. Preferably, the prefix word generator is in the sender CPU.

Yet, another version of the invention may be considered a computer system for the transfer of data, comprising an application means to generate data in a first computer having a native data structure layout, a means to create a prefix word encoding the native data structure layout, a means to append the prefix word to the data, means to transmit the appended prefix word and the data over a transmission network, a means to receive the appended prefix word and data in a second computer, and means to read and decode the prefix word and adaptively reconstruct the data based on the prefix word.

It is further contemplated that an embodiment of the invention may be considered a method to interpret computer data which dynamically adapts to an unknown data structure of the computer data by interpreting a prefix word in which the data structure is encoded.

The invention will further be understood by reference to the Drawing in which:

BRIEF DESCRIPTION OF THE DRAWING

FIG. 1 illustrates various integers in hexadecimal notation in both big and little endian formats.

FIG. 3 presents global objects that can be interpreted in accordance with principles of the invention.

DETAILED DESCRIPTION OF THE INVENTION

Figure 2:
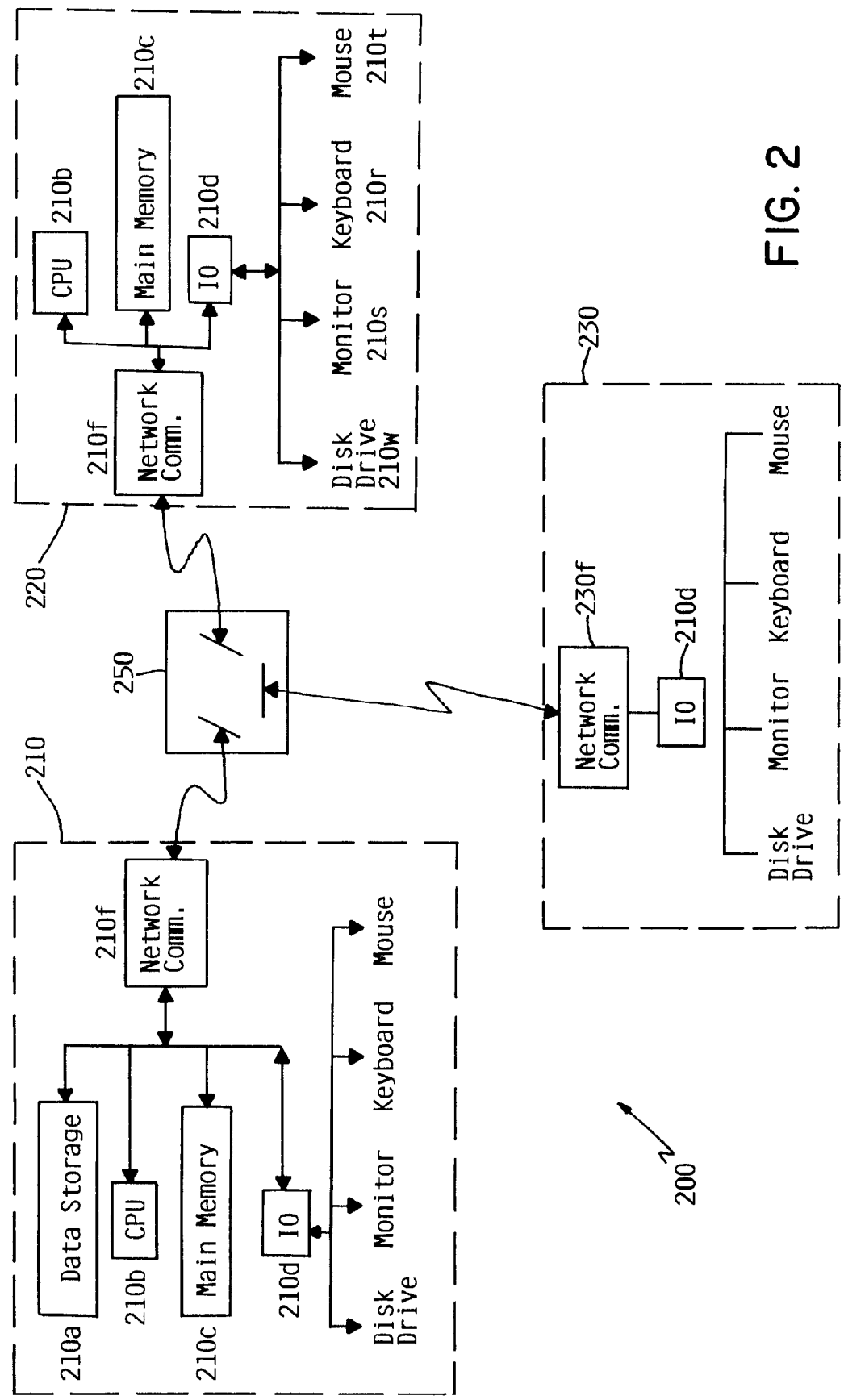
FIG. 2 is a block diagram of a networked computer system capable of implementing an embodiment of the invention.

A suitable computer network 200 which may be used in accordance with the principles of the invention is shown in the simplified block diagram of FIG. 2. The computer network may comprise one or more computers 210, 220 or a terminal 230 networked through an intercommunication system or network 250. Typically, computers 210, 220 include a central processing unit (CPU) 210b, a main memory 210c, input/output (I/O) interfaces 210d, and network communication interface 210f. The CPU 210b may be programmed in any suitable manner that effects the functions described herein. Network communication interface 210f connects the computer to other computers 220 or terminals 230. Terminal 230 may have only I/O devices functionally connected to it and through the network 250 terminal 230 relies on and is in communication with a CPU 210b of another computer 210, 220. A user may interact with source code generator according to principles of the invention via a keyboard 210r, monitor 210s, and a mouse 210t. A removable-media disk drive 210w, such as a floppy disk drive is also provided, and may be used for, among other purposes, storing transmitted data. Although data store 210a is illustrated as being integral to the computer 210 for purposes of clarity and convenience, it may be remotely located and accessed via network communication interface 210f. Similarly, the method described herein and/or the converted data stream may be transmitted to or received from remote computers via network communication interface 210f. It is also envisioned that the method of dynamically adapting to a different data structure layout can be implemented within a single CPU 210b wherein data stored in main memory 210c may have a different data structure than the current program running in CPU 210b. Thus, before the CPU 210b can operate on the data, it must first be able to understand and dynamically adapt to the data structure itself.

As mentioned earlier in the background, typically each CPU 210b may have its own peculiar data structure layout, which may be dependent not only upon the particular processor but also the particular operating system and the particular programming language in which an application may be written. The description herein is intended to be illustrative rather than limiting in the sense that all processors, all operating systems, and all computer languages may take advantage of the principles of the invention as described. The embodiment is presented in terms of a trace program in object-oriented languages, such as Java and C/C++ but one will appreciate that other computer programming languages including Cobol and Fortran can take advantage of the principles of the invention as described.

In data transfer among the computers 210, 220, and terminal 230 of FIG. 2 through network 250, existing protocols that have fixed specifications for data transfer such as those discussed in the background are typically used. For such data and in the context of the invention described herein, features of the data which are not related to the transfer protocols will be interpreted to comprise byte order or endianness, pointer and integer sizes, rounding/padding rules, and bit alignment. Again, these features are not to be construed as limiting and are merely illustrative of data format peculiarities. These and other features shall be referred to as the data structure layout and may be considered as a layer of detail beyond that considered in conventional communication protocols. The data structure layout created in a suitable application on CPU 210 is logically appended to the underlying communications protocol in the CPU 210 of the transmitting computer and transferred as a whole over network 250. The communications protocol information is removed again in the receiving computer 220 or terminal 230 before the techniques described herein are invoked. The result is that, in the preferred embodiment, the receiver 220, 230 sees the data as it has been ordered by the sender's CPU's 210 endian rules, padding rules, and other characteristics of the data structure layout.

Java is a programming language that is able to call other languages and programs by an overt or explicit declaration. Java, moreover, has a Java Native Interface which can create and manipulate Java objects using C/C++. Because C/C++ is used, data appears from the Java Virtual Machine (JVM) using native byte order and other C conventions. Using the Java Native Interface (JNI) protocols, several trace programs can be called by a JVM which trace data of an arbitrary Java program and present the various events. Java Virtual Machine Profiler Interface (JVMPI) is a C/C++ high level protocol around which a number of these trace programs can be defined. In an embodiment of the invention the sending CPU has a simple trace program which receives the output of the JVMPI protocol and passes the data to a receiver program over a network with little or no change. The receiver CPU dynamically interprets and reconstructs this stream accounting for its peculiarities before it attempts further analysis. Thus, on top of the JVMPI protocol and other data transfer protocols already in place, the data stream is transferred in the sender's native byte order, native pointer size, native integer sizes for short, long, longlong, native structure rounding rules, and native bit alignment. Further, to minimize the cost and complexity of transmitting large amounts of data such as that generated by a JVMPI protocol trace program or any data-intensive program, it has been chosen that the receiver adapts to the details of the data structure layout of the sender, especially in the instance when the transmitting CPU transmits the data through a network to multiple receiving CPUs of unknown and perhaps different endianness and/or other peculiar details of the receivers data structure layout. It will be appreciated, however, that in certain circumstances the required complexity of adapting one data structure layout to another can occur in the transmitting computer or other aspect of the system which transmits data as well.

In the transfer of data from one computerized electronic device to another, something in the data stream must not only identify the byte order but should also have information to enable other elements of the data stream to be unambiguously interpreted. That something in the preferred embodiment of the invention is that the sender of the data encodes the details of its data structure layout in a self-ordering prefix of bytes prior to the transmitting the actual data. The receiver of the data then adaptively reconstructs the data based on the self-ordering prefix bytes. Thus, it is contemplated that two phases are required for implementation of the invention: a design phase to construct the self-ordering prefix; and second, an execution phase to interpret the prefix and reconstruct the data stream in the receiver.

Figure 4:
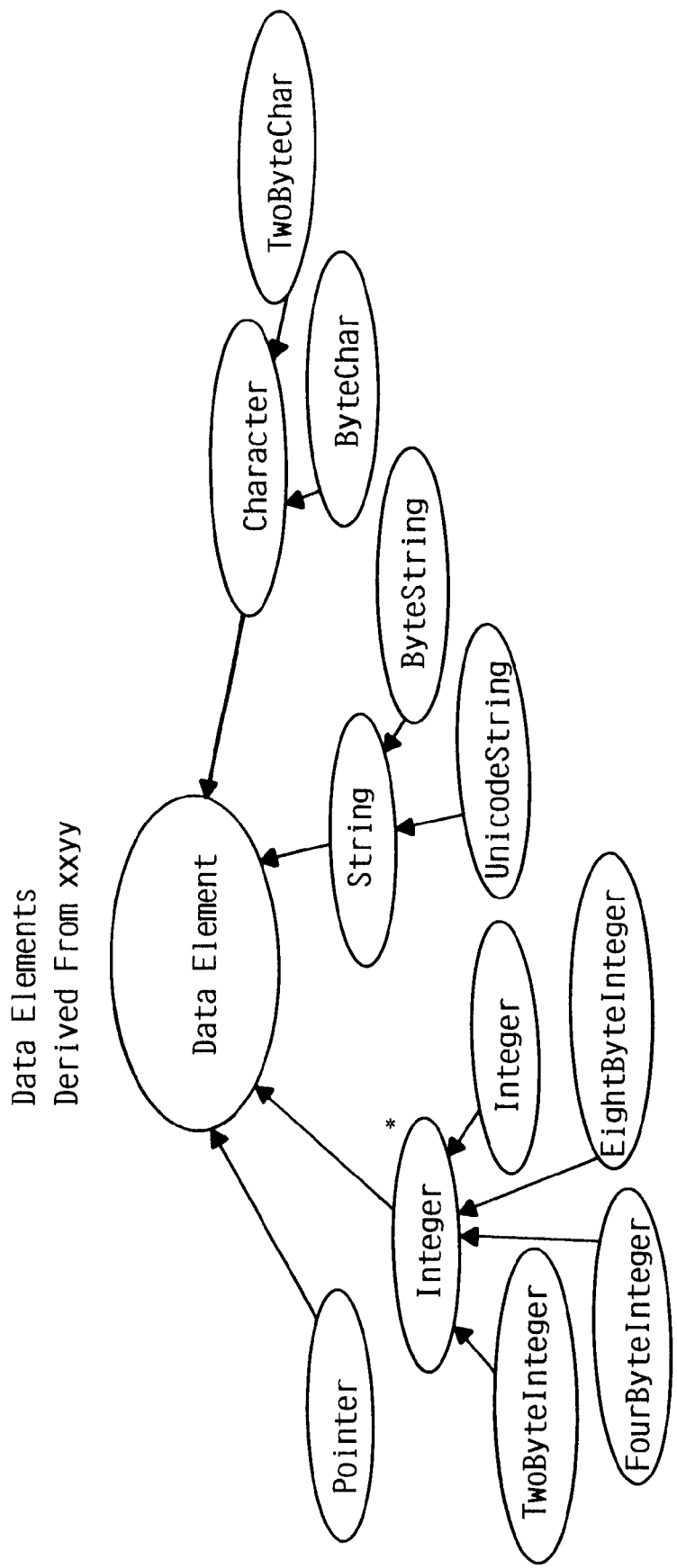
FIG. 4 presents data elements that can be interpreted in accordance with principles of the invention.

More particularly, the preferred embodiment of the invention herein adapts a concept from the Unicode standard which is an international standard for the exchange of multilingual plain text files. The transmitting CPU creates a prefix word of thirty-two bits borrowing from reserved Unicode characters in the form of FExxyyFF or FFyyxxFE in which the values of xx and yy are used to define the elements and details of the data structure layout, as listed in FIGS. 3 and 4. The transmitting CPU constructs the prefix word in which the most significant eight bits of the four byte integer is 0xFE in hexadecimal notation, the next most significant bits are xx, followed by yy and the least significant eight bits of the prefix word is 0xFF in hexadecimal notation. The number of bits is somewhat arbitrary and more or less than thirty-two bits can be used to represent additional features or details of the data structure layout. When the receiver of the data stream interprets the value of the prefix word as a four byte data array according to the definition of endianness and the method of storing integer types in computers, it interprets FExxyyFF to mean that the underlying data stream is in big endian. On the other hand, when the prefix word of the incoming data stream is FFyyxxFE, the receiving CPU interprets the original data stream to have originated from a machine of little endian. Those skilled in the art can readily construct how to interpret this first thirty-two bytes as a sixteen bit integer as well as interpreting it to be a larger integer, e.g., sixty-four bit integer. If the integer is sixteen bits a second integer immediately following can contain xxyy in the sender's byte order, because the first two bytes reveal the byte order of the sender. Likewise, those skilled in the art will appreciate that when the receiver program is written in Java, it will presume its local endian to be big endian regardless of the underlying machine's choices.

Based on an preexisting understanding between the sending CPU and the receiving CPU on the type of data and high level format of the data, the prefix word having the high order bytes as 0xFE and low order bytes as 0xFF now unambiguously identifies the byte order or endianness. Accordingly, the relative location of the values xx and yy can be interpreted because their positions in the prefix word are predetermined. Thus, xx and yy will be used, as described, to adaptively interpret the native data structure layout of the output stream irrespective of the byte order and receiving conventions of the receiving computer system.

What is important to note is that the data is derived from a particular application, e.g., a trace program in JVMPI protocol with its own data structure having unique data elements. Each data structure and each data element of every data structure of the application must be known on a high level so that the details encoded into the prefix word can be applied to the data structure and its elements. Thus, the receiving CPU must know the data on a high level, e.g., that the data comprises trace data identifying specific register locations followed by the value of the data followed the destination of the data, etc. all specified by a particular number of integer types, characters, or pointers in a particular order. A receiving CPU must also know its own endianness, which it may inherently know or may exist in the compiler or may have a reference to a program to discern its own endianness. Given these principles, the transmitted data can be decoded in accordance with principles of the invention.

Figure 5:
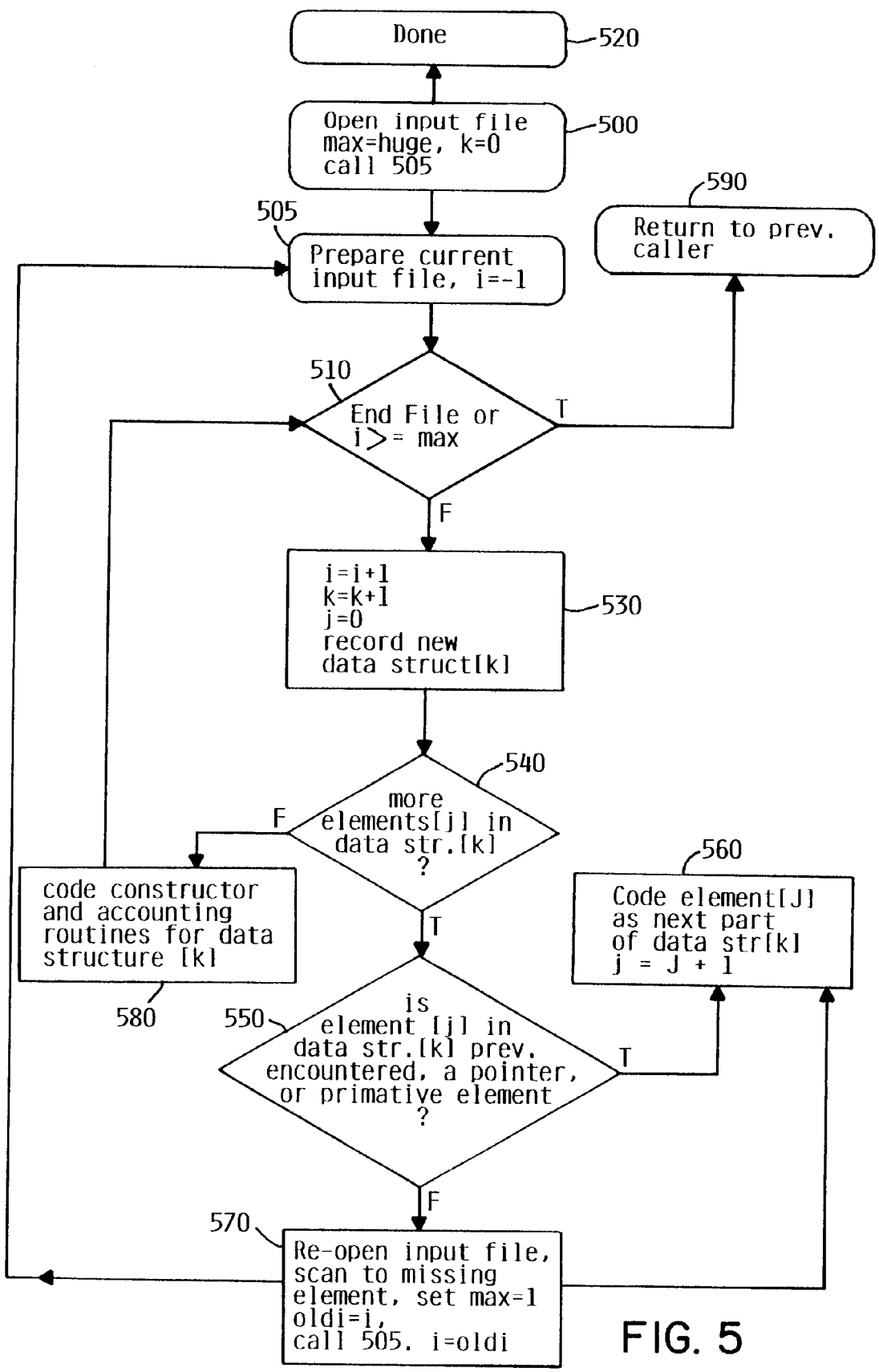
FIG. 5 is a simplified flow chart of how to construct a prefix byte to interpret generalized data in accordance with principles of an embodiment of the invention.

FIG. 5 is a simplified flow chart of how to encode the data structure layout in the sender prior to actual processing. The discussion that follows is by way of example only. Each data structure and each data element of every data structure are reviewed and encoded according to the source level understanding of the data and its layout, which has been previously communicated.

Encoding the data structure layout is a recursive procedure. For an arbitrary C or C++ structure, every data item is either an elementary primitive or another data structure embedded in another data structure. A data item also contains pointers to data structures. Pointers, however, are a primitive type and in themselves present no difficulty. In a well-defined program, any progression of embedded data structures, one containing the other, eventually terminates as primitives. C and C++, moreover, are sufficiently static languages in that the initial information coded with the data structure completely determines the sequel of the data structures following in terms of names, lengths, and contents as defined by the coder and ordinary C/C++ compilation processes.

The one exception to this static definition—certain dynamic array and structure allocation, is omitted from the description of FIG. 5. In these dynamic cases, some data element invariably represents the length allocation such that any ambiguity from the static definition can be readily resolved at run time. In the context of I/O communication, moreover, this length must precede the variable length data itself so its boundaries can be determined. All that is necessary to extend FIG. 5 to account for the problem presented by dynamic array and structure allocation is to ensure the source input has a suitable semantic process such as a C #pragma that enables the primitive variable representing the length to be tied by the process of FIG. 5 to the dynamically allocated data structure. This will allow such a length to be coded in the object constructor and so enable the data to be reconstructed as in FIG. 6 as will be shown later by the receiver at run time.

FIGS. 5, as a recursive procedure, has an ordinary flow but also represents closed subroutines that can be called with suitable parameters. The closed subroutines calls are described and shown with dashed lines. In this case, the parameters are an input files and a maximum value, max. The exact contents of the input file are not specified but it is assumed some suitable parsing format exists. It might be actual C/C++ source input after the preprocessing phase or another suitable format which contains the syntax and semantic information to sufficiently describe the original source code to be distinguished by the algorithm shown. For clarity, error cases are omitted. Structures in the input are assumed to be defined exactly once and which structure is currently being defined is well-described by the input. The required input, including the missing error cases, is known. Traditional compilation elements are not described in any detail; only the portion unknown in existing compilation style processes are described.

In block 500, the data file as described above, is input and the maximum value is set to some effectively infinite positive value. In block 505, the recursive process begins by opening the current file and setting a variable i to −1. Execution continues at block 510 to check for more data in the input file or to see if i has reached it maximum value. On the first iteration on a non-empty file, both conditions will be false, so execution branches to block 530. Later, when the test at block 510 is made again, either condition being true will terminate the current recursion. Execution returns to just after step 505 via block 590 by ordinary call/return semantics.

Continuing at block 530, some basic data bookkeeping is accomplished. Variable i is incremented as is global variable k. Variable k is the variable showing the "high water mark" of data structures which have been processed. In block 530, information about the new data structure just encountered is recorded. It is assumed, without loss of generality, that the name of the new data structure is the first item encountered.

At block 540, a check is made to see if there are more data elements in the current data structure being defined in data structure k. If not, this data structure has been completely recognized. In that case, block 580 is executed which defines the constructor for the data structure that the receiver will eventually execute. The code so generated assumes certain key values will be made available to the receiver at run time as will be discussed with reference to FIG. 6. This code need merely reference such values in the coding as variables; it need not know and, in fact, cannot know their actual contents. At a minimum, the code generated at block 580 will reconstruct an object using the dynamic elements as variables filled in at run time by the process of FIG. 6. If useful, it may also generate code for other items, such as the length of the data structure, using the same basic information.

If there are more data structures, the next question at block 550 queries whether the next data structure or primitive at element [j] has already been recognized. If the current element is a primitive, such as a pointer, character, or an integer, it automatically is known and the correct name is coded in block 560. For previously encountered data structures, the previous data structure name is used including any parameters passed, such as a C++ constructor input passed to it. This enables the just-discovered embedded object to be properly invoked as part of the current object's construction when the code is generated at block 580.

If the name is a data structure that is not known, then a recursive call is made to find it. At block 570 a suitable copy of the input file is made. The new file is repositioned, scanning from the start until the unknown structure is discovered. Then a recursive call is made to block 505 with the new file positioned just before that point so that block 505 sees the "whole object" and the maximum is set to one. It may be that this recursive call also finds itself at block 570. If so, the process repeats with the new unknown structure. In well-defined programs in C/C++ or other languages, eventually only primitives remain and the exit in block 590 returns to the previous caller's block 570. Thus, not only is the immediately unknown data structure discovered by the initial recursive call, any subsequent data structures which are unknown in subsequent recursions are also managed. The value of global variable k may have been incremented and proper coding is performed in block 560 for the now-known data structure.

When the last return at block 590 is made, control is returned not to block 570 as in the recursive case, but to block 500. In this case, block 520 is entered to complete the process. The information developed, now fully known at block 520, can be suitably compiled to produce the part of the analysis program that dynamically adapts to the actual data element size, byte order, rounding, etc. as discussed with respect to FIG. 6.

Note that the process in FIG. 5 does not code the analysis itself; rather the process makes it possible for the receiver to compile such source and correctly decode the incoming data stream into useful objects. The analysis proper is coded in the ordinary way. Some elements of the C/C++ data struct in the chart below can be encoded using the composite Java/C/C++ code that follows:

| C/C++ Primitive | Receiver Class |
| --- | --- |
| int | Integer |
| long | Long |
| longlong | EightByteInteger |
| short | TwoByteInteger |
| void* | Pointer |
| wchar[ ] | UnicodeString |
| char[ ] | ByteString |
| char | ByteChar |
| wchar | TwoByteChar |
| data_element(a,b,c) | data_element(a,b,c) |
| data_element* | Pointer |

Note that data_element is an arbitrary name of an embedded data structure, such as a C struct, a C++ object or template. The form data_element* is simply a pointer to a data_element and is therefore coded as a Pointer class. In the dynamic allocation case not covered in FIG. 5, this is where the added semantic information about how many array elements to allocate would be recorded by the compilation process of FIG. 5. An example of the output of the process shown in FIG. 5 is the following code in which the values of xx and yy encode the data structure layout information comprising byte order, pointer size, various integer sizes, and rules for inserting pad bytes between members in a high level language's source. If the data following is a multiple byte character string, it may encode further information about that character's endian rules.

```
class exampleCStructure {
  Integer ele1; // original declare by sender int ele1;
  TwoByteInteger ele2; // original declare by sender: short
    ele2;
  Pointer ele3; // original declare by sender void* ele3;
  Integer ele4; // original declare by sender: long ele4;
  integer totalsize( ) {return ele1.size( )+padrules[ele1.size(
    )][ele2.size( )]+
    ele2.size( )+padrules[ele2.size( )][ele3.size( )]+
    ele3.size( )+padrules[ele3.size( )][ele4.size( )]+
    ele4.size( );
  exampleCStructure(byte[ ] inputsource) {
    int i=0;
    ele1=new Integer.getDetailType(global.sizeofCInt,addr
      (byte[i]),senders_endian);
    i+=padrules[ele1.size( )+padrules[ele1.size( ),TWO_
      BYTE_INTEGER];
    ele2=new TwoByteInteger(addr(byte[i]),senders_
      endian);
    i+=padrules[ele2.size( )+padrules[ele2.size(
      )][global.sizeofCPointer];
    ele3=new Integer.getDetailType(global.sizeofCPointer,
      addr(byte[i]),senders_endian);
    i+=padrules[ele1.size( )+padrules[ele1.size( )],
      [global.sizeofCLong];
    ele4=new Integer.getDetailType(global.sizeofCLong,
      addr(byte[i]),senders_endian);
  };
};
```

Figure 6:
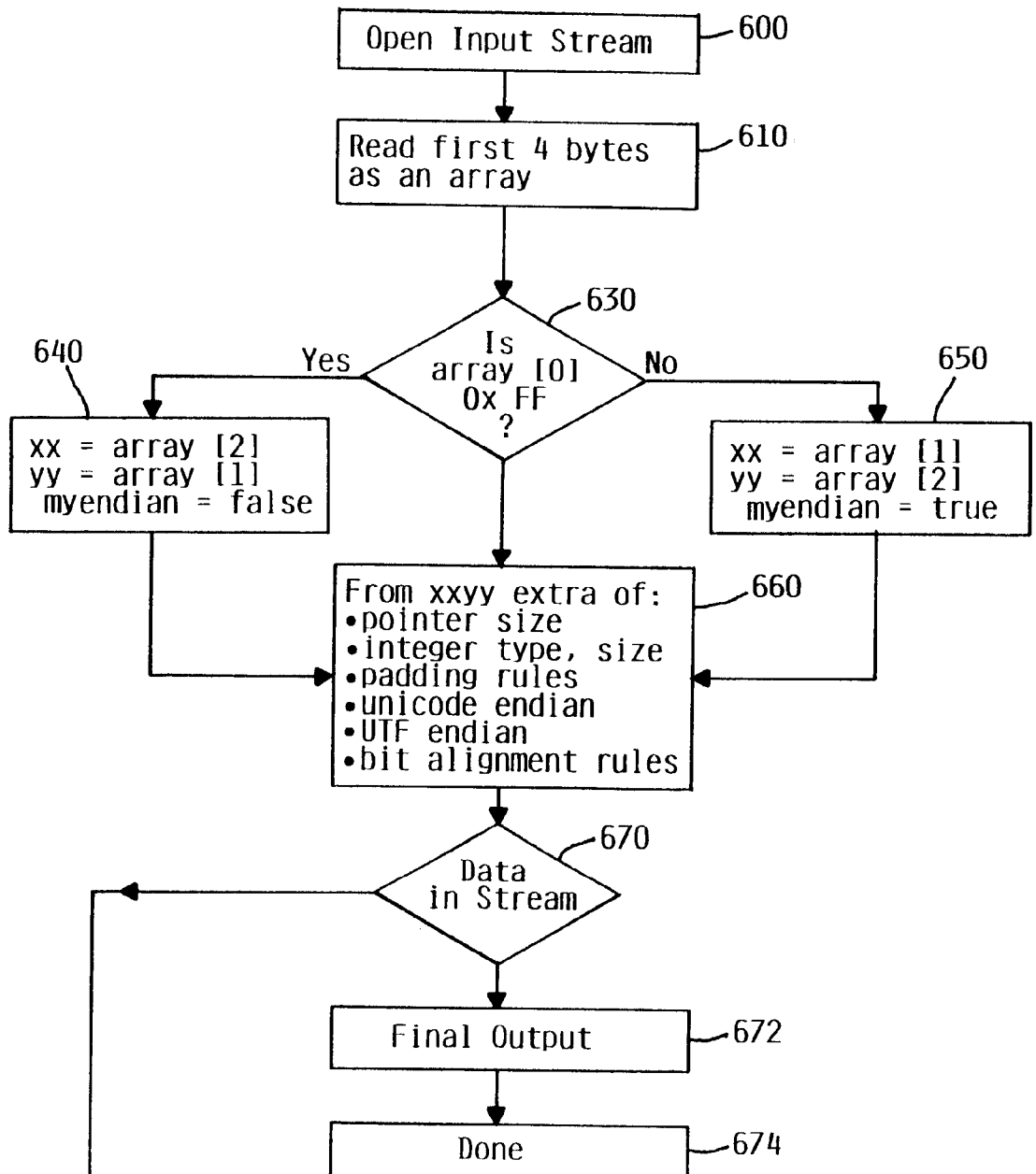
FIG. 6 is a simplified flow chart to a method to interpret data from a data stream in accordance with principles of an embodiment of the invention. It is suggested that FIG. 6 be printed on the face of the patent.

The receiving CPU thus becomes aware of the what data to expect and in what order that data will be transmitted. Now, to move from design to execution, some arbitrary sender creates a data stream, for example a JVMPI data stream. It encodes the prefix word and the data are then transmitted, preferably in the senders' native data structure layout, and are received. FIG. 6 is a simplified flow chart of the process describing the reception and reconstruction of the data in a big endian receiver. First, in block 600 the receiver opens and receives the data stream. In block 610, the first four bytes of the data stream are read as four separate bytes in an array. In block 630, the first byte in array [0] is evaluated to determine the endianness. If the first byte in array [0] is 0xFE the receiver interprets the byte order to be big endian, and sets up array [1] and array [2] to be evaluated for xx and yy, respectively, as shown in block 650. If, however, the first byte in array [0] is not 0xFE but is 0xFF the receiver then interprets the data to be little endian in the alternative embodiment and evaluates the data and evaluates xx as array [2] and yy as array [1], as illustrated in block 640. In any event, once byte order is established, then in block 660, other features of the data structure layout including pointer size, integer type and size, padding rules, Unicode endian coding, UTF endian coding, and bit alignment rules are reconstructed. In block 670, data is received and in block 680 the data is placed into a reconstructed object for a program, such as an accounting program for JVMPI or other program to access these data structure objects, as in block 690. If, however, in block 670, no data structure layout need be constructed because all the data received has been read, the data is output as in block 672 and process is complete in block 674. The example of FIG. 6 showed the case where the receiver program knows a priori that it is executing under big endian rules.

By well known art, the receiver's endian can be determined at run time. A function can return TRUE for big endian and FALSE for little endian. Suppose a variable Q receives the result of this function. It so, adapting FIG. 6 merely requires adding Q=WellKnownFunction in block 610 and replace myendian=true in block 650 with myendian=Q and in block 640 replace myendian=false with myendian=NOT(Q).

An example of how the input data stream is reconstructed in the receiver is presented in a composite of Java/C++ code.

```
class TwoByteInteger extends Integer {
  short mydata; //short means exactly 16 bit integer on all
    machines
  boolean myendian;
  TwoByteInteger(short myd, boolean mye) {if (mye)
    mydata=myd; else mydata=SwapEndian(myd);
  };
  integer elementType( ) {return TWO_BYTES; };
  returnUniversalValue( ) {return (longinteger) mydata; };
  integer size[00bf] ) {return 2; };
};
class FourByteInteger extends Integer {
  integer mydata; // integer means exactly 32 bit integer on
    all machines
  boolean myendian;
  FourByteInteger(integer myd, boolean mye) {if (mye)
    mydata=myd; else mydata=SwapEndian(myd);
  };
  integer elementType( ) {return FOUR_BYTES;};
  longinteger returnUniversalValue( ) {return (longinteger)
    mydata; };
  integer size( ) {return 4; };
};
class EightByteInteger extends Integer {
  longinteger mydata; // longinteger means exactly 64 bit
    integer on all machines
  boolean myendian;
  EightByteInteger(longinteger myd, boolean mye) {if
    (mye) mydata=myd; else mydata=SwapEndian(myd);
  };
  integer elementType( ) {return EIGHT_BYTES; );
  longinteger returnUniversalValue( ) {return (longinteger)
    mydata; };
  integer size( ) {return 8; };
};
class Pointer extends Integer {
  Integer mydata;
  Pointer(integer mytype, byte [8] nextdata, boolean mye) {
    if (mytype==TWO_BYTES) mydata=(Integer) new
      TwoByteInteger((short)nextdata,mye);
    if (mytype==FOUR_BYTES) mydata=(Integer) new
      FourByteInteger((short)nextdata,mye);
    if (mytype==EIGHT_BYTES) mydata=(Integer) new
      EightByteInteger((short)nextdata,mye);
  };
  integer elementType( ) {return mydata.elementType( );};
  longinteger returnUniversalValue( ) {return
    mydata.returnUniversalValue( ); };
  integer size( ) {return mydata.size( ); };
}: // end pointer;
class Long extends Integer {
  integer mydata:
  Long(integer mytype, byte [8] nextdata, boolean mye){
    if (mytype==TWO_BYTES) mydata=(Integer) new
      TwoByteInteger((short)nextdata,mye);
```

```
        if (mytype==FOUR_BYTES) mydata=(Integer) new
            FourByteInteger((short)nextdata,mye);
        if (mytype==EIGHT_BYTES) mydata=(Integer) new
            EightByteInteger((short)nextdata,mye);
    };
    integer elementType( ) {return mydata.elementType( );};
    longinteger returnUniversalValue( ) {return
        mydata.returnUniversalValue( ); };
    integer size( ) {return mydata.size( ); };
};
class Integer extends DataElement {
    virtual longinteger returnUniversalValue( ); // defined in
        child objects only
    virtual integer elementType( ); // defined in child objects
        only
    virtual integer size( ): // defined in child objects only
    static Integer giveDetailedType(integer mytype,byte[8]
        nextdata, boolean mye) {
        if (mytype==TWO_BYTES) return (Integer) new
            TwoByteInteger((short)nextdata, mye);
        if (mytype==FOUR_BYTES) return (Integer) new
            FourByteInteger((integer)nextdata, mye);
        if (mytype==EIGHT_BYTES) return (Integer) new
            EightByteInteger((longinteger)nextdata,mye);
};
static class global {// only this one instance
    public:
        eval (BYTE=1, SHORT=2, INTEGER=4,
            LONGLONG=8 };
        boolean senders_endian; // is one if "my endian" or
            zero if "isn't my endian"
        byte padrules[9][9]; // this allows encoding of pad bytes
            for all cases, short followed by int, int by
            // short, byte by long int, etc. The array is filled in
                sparsely, so that the size of
            // the element of the left index can be the "prior"
                element and the size of the
            // following element can be the right index
        integer sizeofCPointer; // size of the pointer on the
            "sender's machine". Usually 4 or 8 bytes
        integer sizeofCInt; // usually, FourByteInteger
        integer sizeofCLong; // usually, FourByteInteger
static main(byte[ ] inputsource) {//
    integer myendian=wellKnownTechnique( ); // discerning
        one's own endian is in the literature
        // myendian will have 1 if the local endian is big endian,
            0 if little endian
    byte xx;
    byte yy;
    byte test[4]=copy(inputSource,0,3); // copy first four
        bytes.
    if (test[0]==0xFE) {global.senders_endian=myendian;
        xx=test[1]; yy=test[2];}
    else if (test[0]==0xFF) {global.senders_endian=1 XOR
        myendian; xx=test[2];yy=test[1];}
    else System.error.exit(1,"Bad input source format");
    // beyond this point, xx and yy can be used as arbitrarily
        defined to obtain more information.
    // this information must be sufficient to the purpose.
        Conceptually, it should contain information to fill
    // in the padRules array, and how to set sizeofCInt,
        sizeofpointer etc.
    // From here, the techniques of exampleCStructure can be
        used to parse this data and put it in the
    //global structure.
};
```

The above code above sets global objects of integers. The integer represents arbitrary integers as coded by a C/C++ programmer based on information derived from xx and yy to chose between two, four, and eight byte integers. The code also includes the capability to distinguish between receiver and sender's endian format. Then the main specification is built and is run to apply the appropriate data structure to particular elements.

Pointer size may require the interpretation of two bits.

| | |
|---|---|
| 00 = | 16 bits |
| 01 = | 32 bits |
| 10 = | 64 bits |
| 11 = | 128 bits |

A long integer is usually thirty-two bits but in some instances a long integer could be sixty-four bits. A single bit can represent these possibilities for size of long integer.

| | |
|---|---|
| 0 = | 32 bit integer |
| 1 = | 64 bit integer |

For UTF8 data versus Unicode versus Big/Little Endian. Two bits of xx/yy are required and an example of the interpretation is as follows. If UTF7 data is present, a slightly different coding requiring one more byte may be required.

| | |
|---|---|
| 00 = | Big Endian Unicode |
| 01 = | Big Endian UTF8 with mixed single and big endian double byte |
| 10 = | Little Endian Unicode |
| 11 = | Little Endian UTF8 |

Coding to indicate the padding of the incoming data stream can be accomplished with the table below. The information could be extended to encode irregular sizes of word boundaries but the maximum practical size is eighty-four bits (twenty one times four) because very few architectures pad when two adjacent elements are the same size, Adding two adjacent elements of the same size requires thirty more bits which would take the solution to four added integers.

| | byte 1 byte | short 2 bytes | 32 bit int 4 bytes | longlong 8 bytes | pointer |
|---|---|---|---|---|---|
| byte - 1 byte | x | value | value | value | value |
| short - 2 bytes | value | x | value | value | value |
| long - 4 bytes | value | value | x | value | value |
| longlong - 8 bytes | value | value | value | x | value |
| pointer | value | value | value | value | x |

Note that "int" is not shown in the above table. "Int" will use the row/column above, i.e., "short", "32 bit int", or "longlong", based on its floating size. Likewise, long will also use "32 bit int" or "longlong" based on its floating size.

Byte alignments can be sufficiently encoded as follows because there is little variability in actuality.

```
000 =   round up to next "natural" alignment for the "to"
001 =   round up to next "natural" alignment for the "to"
        or nearest two byte boundary, whichever is smaller
010 =   round up to next "natural" alignment for the "to" or
        nearest four byte boundary, whichever is smaller
011 =   round up to next "natural" alignment for the "to" or
        nearest eight byte boundary, whichever is smaller
100 =   round up to next sixteen bit boundary regardless,
        except if data is byte followed by byte
101 =   round up to next thirty-two bit boundary regardless,
        except if data is byte followed by byte
110 =   round up to next sixty-four bit boundary regardless,
        except if data is byte followed by byte
```

To limit available choices in the preferred embodiment to sensible cases, bit alignment rules could be encoded with three bits, e.g.,

```
000 = Most Significant to Least Significant Order, restarting every
      thirty-two bits
001 = Least Significant to Most Significant Order, restarting every
      thirty-two bits
010 = Most Significant to Least Significant Order, restarting every
      sixteen bits
011 = Least Significant to Most Significant Order, restarting every
      sixteen bits
1xx = Any other encoding with many integers following 0xFExxyyFF
      in sender's order.
```

To summarize, xx and yy where bit 0 of xx is the high order bit, could be defined as:

|     | bits | data structure layout detail |
|-----|------|------------------------------|
| xx  | 0    | size of long integer         |
|     | 1–2  | pointer size                 |
|     | 3–4  | UTF8 vs. Unicode             |
|     | 5–7  | byte alignment               |
| yy  | 0–2  | bit alignment                |
|     | 3–7  | integer size                 |

Although a specific embodiment of the invention has been described herein in some detail, this has been done solely for the purpose of illustrating the invention in various of its aspects, and it is to be understood that the foregoing description does not limit the scope of the invention. There are other potential data interchange possibilities. For instance, in the context of the preferred embodiment, JVMPI does not use bit alignment rules because Java from whence the data originally flows does not support the concept of bit alignment. Similarly, there are other floating point formats but Java presents the illusion that all the formats are IEEE which follow the endian rules for the integers of the same size integer value. C/C++ could potentially add nonIEEE floating point data but practicably floating point data could be avoided entirely for a trace-style data flow which mostly counts events and could always give a total and individual counts in lieu of any floating point data. It is contemplated that various substitutions, alterations and/or modifications to the embodiment of the invention disclosed herein, including but not limited to those implementation options specifically noted herein, may be made to the invention without departing from the spirit and scope of the invention as defined in the appended claims:

What is claimed is:

1. A method of computing, comprising the steps of:
   (a) receiving a first data stream in a sender's native data structure layout from a sender;
   (b) reading a prefix word of said first data stream, said prefix word of the format FFyyxxFE or FExxyyFF in which FFyyxxFE indicates that said sender's native data structure layout is of one endianness and FExxyyFF indicates that said sender's native data structure layout is of the other endianness;
   (c) deriving said sender's native data structure layout from said prefix word; and
   (d) dynamically reconstructing data of said data stream based on said prefix word.

2. The method of claim 1, wherein step of deriving said sender's native data structure layout from said prefix word further comprises determining the existence of at least one integer in said data stream and a size of said at least one integer.

3. The method of claim 2, wherein said step of determining the existence of at least one integer and said integer's size further comprises determining the existence and size of short integers, integers, and long integers.

4. The method of claim 1, wherein said step of deriving said sender's native data structure layout from said prefix word further comprises determining the existence and size of pointers.

5. The method of claim 1, wherein said step of deriving said sender's native data structure layout from said prefix word further comprises determining padding rules/byte alignment of said data stream.

6. The method of claim 1, wherein said step of deriving said sender's native data structure layout from said prefix word further comprises determining bit alignment.

7. The method of claim 1 wherein said format FExxyyFF represents that said sender's native data structure layout is big endian.

8. The method of claim 1 wherein said format FFyyxxFE represents that said sender's native data structure layout is little endian.

9. A method of computing, comprising the steps of:
   (a) receiving a first data stream in a sender's native data structure layout from a sender;
   (b) reading a prefix word of said first data stream, said prefix word of the format FFyyxxFE or FExxyyFF in which FFyyxxFE indicates that said sender's native data structure layout is of one endianness and FExxyyFF indicates that said sender's native data structure layout is of the other endianness;
   (c) deriving said sender's native data structure layout from said prefix word, said sender's native data structure layout further comprising the existence and size of short integers, integers, and long integers, the existence and size of pointers, padding rules/byte alignment of said data stream, bit alignment; and
   (d) dynamically reconstructing data of said data stream based on said prefix word.

* * * * *